United States Patent [19]

Sekino

[11] Patent Number: 5,124,038

[45] Date of Patent: Jun. 23, 1992

[54] APPARATUS FOR SEPARATING AND RECOVERING FLOATING LIQUID

[76] Inventor: Mitsuhiro Sekino, 3-36-16, Nishiikebukuro, Toshima-Ku, Tokyo, Japan

[21] Appl. No.: 626,467

[22] Filed: Dec. 12, 1990

[51] Int. Cl.$^5$ .................................. B01D 17/038
[52] U.S. Cl. ........................ 210/512.3; 210/512.1; 210/923; 415/182.1; 415/203; 415/206; 415/207; 415/203; 415/206; 415/207; 416/179; 416/182; 416/185; 209/144; 209/211; 417/423.14
[58] Field of Search .............. 415/182.1, 203, 206, 415/207; 416/179, 182, 185, 188; 417/423.14; 210/512.1, 512.3, 360.1, 242.3, 923; 209/144, 211

[56] References Cited

U.S. PATENT DOCUMENTS

| | | | |
|---|---|---|---|
| 4,001,121 | 1/1977 | Bielefeldt | 210/512.3 |
| 4,361,490 | 11/1982 | Saget | 210/512.3 |
| 4,959,158 | 9/1990 | Meikrantz | 494/37 |
| 4,981,219 | 1/1991 | Burnell et al. | 209/211 |

Primary Examiner—Robert A. Dawson
Assistant Examiner—David Reifsnyder
Attorney, Agent, or Firm—Arthur T. Fattibene; Paul A. Fattibene

[57] ABSTRACT

An apparatus for separating and recovering floating liquid wherein one or more vortex guide plates are horizontally held on the surface of the water inhibiting their rotation, the lower members of the guide plates are submerged under the surface of the water, an enveloping cylinder at the center of vortex has its upper end suitably positioned under the surface of the water and has its lower end submerged deeper than the peripheral guide members, a suction tube for recovery is provided in said cylinder, a rotary impeller is provided under said cylinder in concentric with the vortex guide plates and is rotated in the enfolding direction of the vortex guide plates, and wherein a cylindrical cover is provided between said guide plates and said impeller, said cylindrical cover having an opening in the upper end surface thereof with its diameter being smaller than the diameter of the impeller and further being open at its lower end.

8 Claims, 2 Drawing Sheets

APPARATUS FOR SEPARATING AND RECOVERING FLOATING LIQUID

BACKGROUND OF THE INVENTION

1. Field of the Invention

The present invention relates to an apparatus for separating and recovering floating liquid between two liquids which are insoluble in each other, such as between an oil and the water or between an organic solvent and the water. The apparatus separates and recovers the floating liquid utilizing the interaction of the centripetal force of the spiral vortex flow produced by a vortex guide plate and the pumping action of the impeller.

The apparatus of the present invention is capable of efficiently recovering even those viscous floating liquids having high viscosities that are difficult to recover, and which does not permit the liquid collected and stored in a cylinder at the center of the vortex guide plate to scatter again to the surrounding liquid. The apparatus of the invention stores even a film-like floating liquid of very small amounts up to a predetermined amount, and is further capable of operating intermittently. The apparatus of the invention having the above-mentioned characteristics can be used as a very effective means for preventing environmental pollution in natural and industrial fields when it is used to recover oils and organic solvents on the seas, rivers, ponds and lakes, or when it is used in the factories and household applications.

2. Prior Art

A force of inertia called centripetal force (Coriolis' force) is produced in the coordinate system that revolves at a constant speed. This holds true even in a vortex liquid. Heretofore, the floating liquid has been separated and recovered by utilizing the above force as well as the pumping action produced by the impeller by arranging a vortex guide plate that enfolds in the vortex direction of the liquid to further reinforce the centripetal force, by providing a impeller consisting of a disk having a plurality of vanes on the upper surface thereof under the guide plate, and by rotating the impeller in the direction in which the vortex guide plate enfolds.

According to the conventional system utilizing the centripetal force produced by the vortex guide plate and the impeller only, the vortex speed becomes slow due to viscous resistance when the floating liquid to be recovered has a high viscosity, and the centripetal force conspicuously decreases, too. In order to compensate this, the speed of revolution of the impeller should be adjusted since Coriolis' force varies in proportion to the second power of the angular velocity. When a certain speed is exceeded, however, the centrifugal water draining force becomes predominant due to the pumping action of the impeller, inviting such inconvenience that the floating liquid to be recovered is forced back.

According to the prior art, furthermore, when the impeller ceases to rotate, the liquid that was collected and stored in water at the center of the apparatus with much effort tends to float out again and scatters to the surrounding, liquid, since there no longer exists the suction/drain pumping action flowing from the water surface side to the lower side.

SUMMARY OF THE INVENTION

The apparatus of the present invention improves the aforementioned defective points, and functions to receive floating liquids having wide range of viscosities. The apparatus is equipped with means that prevents the liquid that is once collected and stored from floating again to the surrounding liquid. The apparatus also collects and stores even a film-like floating liquid of very small amounts up to a predetermined amount at the central portion of the vortex guide plate while intermittently actuating the impeller.

In order to achieve the above object, the present invention is equipped with the following two means.

Described below first is how to prevent the counter-flow of the floating liquid or the pushing-back phenomenon near the flow-in port of the vortex guide plate that develops when the impeller revolves at high speeds.

To cope with this, a cylindrical cover having the following specifications is disposed between the vortex guide plate and the impeller.

That is, the cylindrical cover has in the upper end surface thereof an opening with a diameter which is at least smaller than the periphery of the impeller, the cylindrical shell portion thereof having a diameter which is sufficiently greater than the outer diameter of the impeller to cover the impeller, and the lower end thereof being open maintaining a diameter equal to, or greater than, the cylindrical shell portion.

The ratio is sufficiently great between the diameter of the opening in the upper end surface and the diameter of the opening of the lower end side, and the apparatus has been so designed that the pumping action of the impeller will not cause the drain water to flow out from the opening in the upper end surface of the cylinder (i.e., so that the drain water will not flow back into the flow-in ports in the periphery of the vortex guide plate).

Thus, the water stream sucked from the upper surface of the cylinder is caused to flow toward the periphery due to the centrifugal pumping action of the impeller and is drained through the opening at the lower portion of the cylindrical shell. Therefore, the liquid stream at the periphery of the vortex guide plate and the drain stream by the pumping action of the impeller do not interfere each other. Accordingly, the pushing-back phenomenon of the floating liquid does not develop, and the floating liquid can be efficiently recovered.

The second assignment is to prevent the liquid collected and stored at the center of the vortex guide plate from scattering to the surrounding liquid when the impeller is stopped. To cope with this, the following means is employed.

In the conventional apparatus, the vortex cylindrical portion includes an enveloping or collecting cylinder constructed integral with the vortex guide plate as a unitary structure. According to the apparatus of the present invention, on the other hand, the cylindrical collecting member or collector is separated apart from the vortex guide member, and is held to move up and down to emerge out of, or submerge in, the water level, but is prevented from rotating. The cylindrical member or collector is then coupled to an actuator which is controlled by the impeller drive unit. When the impeller revolves, therefore, the cylinder descends and its upper edge submerges under the water level. When the impeller stops, the cylinder floats, and the flow path of the vortex guide plate and the inside of the cylinder make and break communication each time.

The liquid is collected as far as the impeller continues to rotate. When the impeller is at rest, the flow path is interrupted by the raised cylinder or collector and the liquid once collected and stored within the collector is prevented from scattering i.e. exiting from the collector.

The system of the present invention can be very effective when it is intermittently operated to recover thin oil films that may build up sporadically.

The cylinder can be driven by (a) utilizing the downwardly sucking force produced by the pumping action of the impeller, (b) utilizing the centrifugal force of a weight attached to the rotary shaft of the impeller, and (c) utilizing the actuator driven by the external energy (electricity, pneumatic pressure, hydraulic pressure, etc.). Among them, the method (a) produces a weak force and is not practicable. In the following description of the embodiment, therefore, the methods (b) and (c) will be described.

BRIEF DESCRIPTION OF THE DRAWINGS

FIG. 1 is a diagram for explaining the principle and function of the apparatus of the present invention, wherein FIGS. 2 and 3 illustrate an embodiment for preventing the liquid that is collected and stored from scattering, wherein FIG. 2 is a vertical section view for explaining the operation of a system based on the actuator that utilizes the centrifugal force of a weight, and FIG. 3 is a vertical section view of an apparatus with floats of the straight-forward cylinder type.

DESCRIPTION OF THE PREFERRED EMBODIMENTS

Described below in conjunction with the drawings is an embodiment for preventing the counterflow of the floating liquid on the flow-in side when the impeller revolves at high speeds.

Figure 1A:
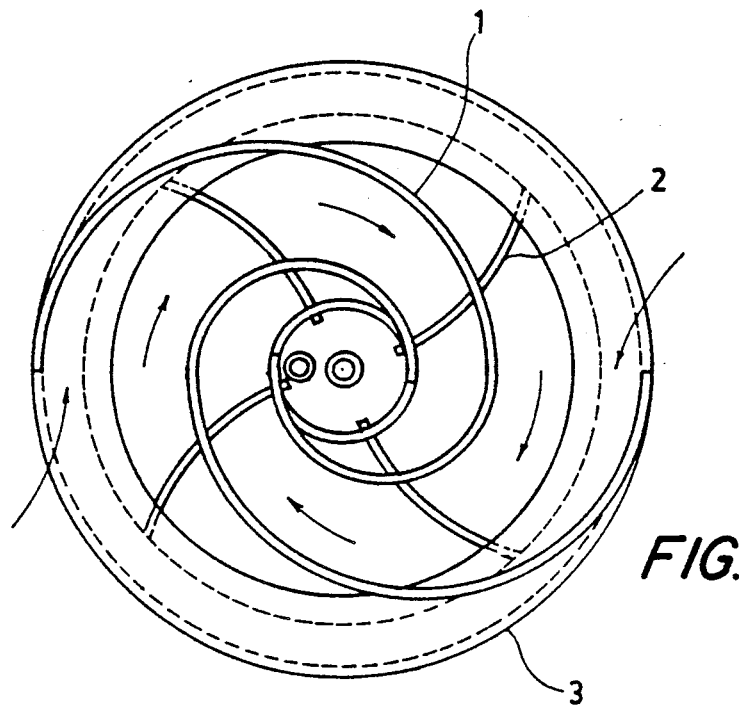
FIG. 1(a) is a plan view and FIG. 1(b) is a vertical section view.
Figure 1B:
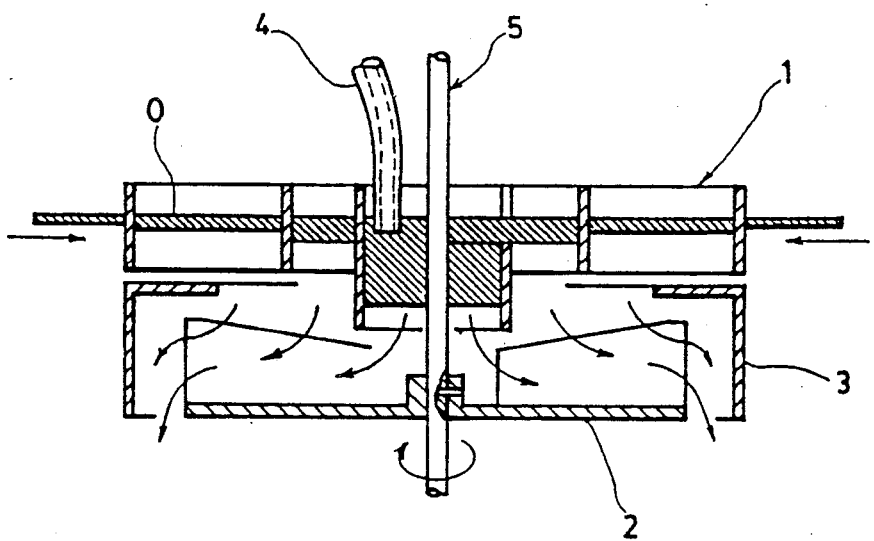

FIG. 1 is a diagram explaining the principle and function of the apparatus of the present invention, wherein FIG. 1(a) is a plan view and FIG. 1(b) is a vertical section view.

Reference numeral 1 denotes a vortex guide plate, reference numeral 2 denotes an impeller, and reference numeral 3 denotes a cylindrical means disposed between the above two members in concentric therewith.

The upper end surface of the cylindrical means includes a cover that has an opening with a diameter smaller than the diameter of the impeller, and the lower end or shell portion thereof is open like a cylinder, the ratio of the two openings being so set that the impeller 2 is allowed to exhibit its pumping action sufficiently.

Symbol 0 denotes a floating or lighter liquid that is to be recovered, reference numeral 4 denotes a suction hose for recovery, and 5 denotes a rotary drive shaft of the impeller.

The vortex guide plate 1 consists of a plurality of members and consists, in the case of FIG. 1, of two members.

For ease of explanation of the functions of the apparatus of the invention, FIG. 1 does not show the main body frame, impeller drive unit, and the member for holding the vortex guide plate 1 and the cylindrical means and cover 3.

In FIG. 1, when the impeller 2 is rotated by the rotary shaft 5 in the enfolding direction of the vortex guide plate 1 (direction of arrows), a vortex stream is generated in the water and the floating or lighter liquid 0 starts rotating. The floating liquid is gradually guided to the central portion due to the centripetal force of the vortex stream and the centripetal stream of the vortex guide plate 1. On the side of the impeller, on the other hand, the liquid under the floating liquid 0 is pulled by the centrifugal pumping action toward the impeller side through the opening in the upper end surface of the cylindrical cover 3, delivered in the radial direction to reach the cylindrical cover 3, and is downwardly drained as indicated by arrows in FIG. 1(b).

Thus, the floating liquid 0 is guided to the center of the vortex as it swirls and is gradually separated from the liquid of the lower layer, and is concentrated, and is collected and stored in the central cylindrical portion or collector. When stored in sufficient amounts, the floating liquid is sucked and recovered through the recovery hose 4 from the collector portion.

The apparatus of the present invention having the aforementioned principle and functions further has the following features.

That is, owing to the cylindrical cover 3, the liquid introduced from the periphery of the vortex guide plate flows in the horizontal direction and the drain water flows downwardly due to the pumping action of the impeller. Therefore, these two streams do not interfere each other.

Even when the speed of vortex stream of a highly viscous floating liquid having high viscous resistance is increased, therefore, there does not develop such an inconvenience that the drain water stream created by the impeller flows back to the flow-in side causing the floating liquid to be forced back, as heretofore.

According to the apparatus of the present invention as described above, floating liquids having wide range of viscosities can be recovered. Moreover, the floating liquids can be efficiently separated and recovered by simply controlling the rotation of the impeller 2.

Described below is an embodiment for preventing the liquid stored in the central portion of the vortex guide plate from scattering when the impeller is stopped.

Figure 2:
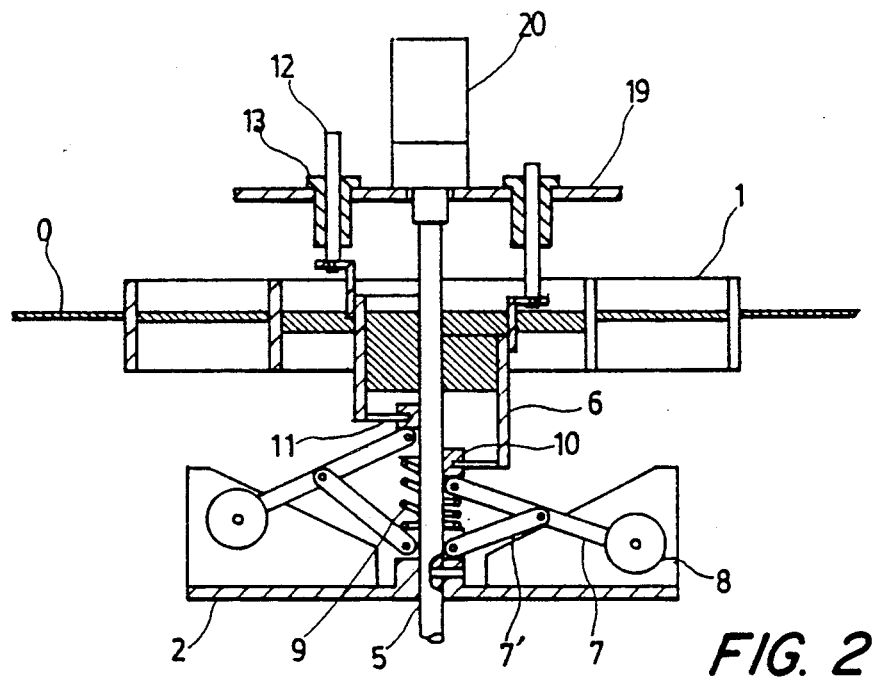
Figure 3:
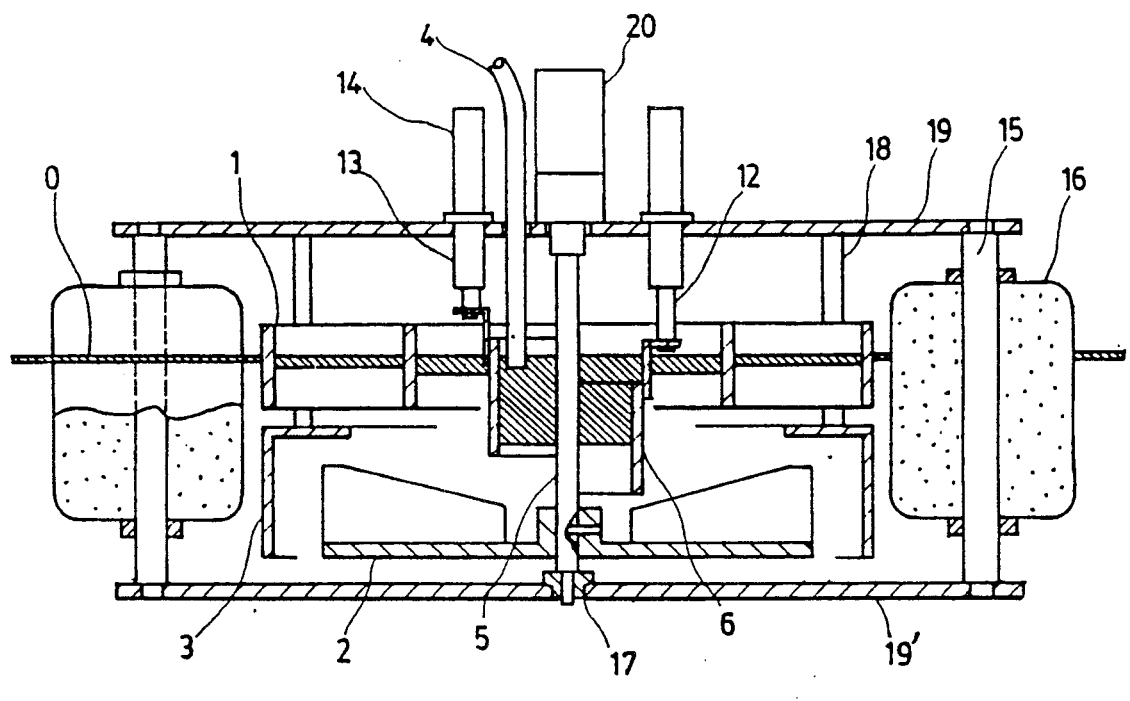

First, FIG. 2 is a vertical section view showing major portions of the weight-type centrifugal force system, and FIG. 3 is a vertical section view of the apparatus with the floats of the straight-forward cylinder type.

The basic constitutional members 1 to 5 are common to those of the case explained with reference to FIG. 1 and, hence, their plan views are omitted but their vertical section views only are presented.

FIG. 2 shows constitutional members which are at least necessary for explaining the invention; i.e., only portions of the upper frame of the main body are shown, but the cylindrical cover and the suction hose are not shown.

In FIG. 2, the cylinder 6 at the central portion of the vortex guide plate 1 is separated from the guide member, a plurality of slide bars 12 are mounted on the upper edge of the cylinder 6 to maintain gravity balance, and sleeves 13 that fit to the slide bars 12 are mounted in the upper frame 19 of the main body as shown in the drawing. Linear bearings can be effectively utilized as the sleeves.

Therefore, the cylinder 6 is prevented from rotating but is held being allowed to slide up and down relative to the surface of the water. Actuators 7, 7', 8, 9 and 10 similar to those of the centrifugal-type governor are incorporated under the cylinder 6.

That is, a plurality of link arms 7 are pivotted by pin to a slide ring 10 that is fitted to the rotary shaft 5 to slide up and down, a weight 8 is attached to the tips of the link arms 7, an auxiliary link arm 7' is pivotted by pins to a middle portion of the link arm 7 and to the boss of the impeller 2, all of these members being allowed to turn together with the impeller. The slide ring 10 slides up and down due to the expansion and contraction operations of the link arms 7, 7'. A compression spring 9 is fitted between the slide ring and the impeller boss. A groove is formed in the upper outer periphery of the slide ring 10, and a plurality of rod-like rims 11 extending from the bottom of the cylinder 6 are slidably fitted thereto so as to move up and down following the slide ring 10 but without inhibiting the slide ring from rotating.

FIG. 2 shows the thus constituted centrifugal force-type actuator, wherein the right half of the rotary shaft 5 is under the condition where the impeller is rotated and the left half is under the condition where the impeller is at rest.

Referring now to the right half of FIG. 2, when the rotary shaft 5 of the impeller is rotated by a impeller drive unit 20, the actuators 7 to 10 are also rotated, whereby the link arms 7, 7' are opened in the radial direction due to the centrifugal force of the weights 8, the slide ring 10 is pulled down against the spring 9, and the cylinder 6 is pulled down into the water via the rim 11. Thus, the flow path is opened from the vortex guide plate 1 to the cylinder 6, and the floating liquid is collected and stored smoothly.

The impeller drive unit 20 used in the apparatus of the invention may be an electric motor, a pneumatic pressure motor or a hydraulic pressure motor, which should desirably be used in combination with a reduction gear mechanism.

Described below with reference to the left half of FIG. 2 is the case where the impeller is at rest. In this case, the weights 8 produce no centrifugal force, and the slide ring 10 is pushed up by the spring 9 just contrary to when the impeller is rotated. Therefore, the cylinder 6 rises and its upper end floats on the surface of the water, and the flow path leading to the vortex guide plate 1 is interrupted by the side walls of the cylinder 6. The liquid stored in the cylinder 6, therefore, is prevented from scattering.

In the foregoing was roughly described the actuator system utilizing the centrifugal force of the weights.

Next, described below with reference to FIG. 3 is an embodiment of the actuator system using straight-forward cylinders.

What makes this system different from that of FIG. 2 is that the upper ends of the slide bars 12 of the cylinder 6 are directly coupled to the cylinders 14. Other basic members 1 to 5 of the apparatus, and the cylinder 6 for storing liquid, slide mechanism members 12, 13 shown in FIG. 2 and their functions, are all the same and are not described here again.

In the embodiment of FIG. 3, the main body frame is equipped with floats 16 which move following a change in the water level. For this purpose, the main body frame is provided with an upper frame 19 and a lower frame 19' which are coupled together with a plurality of support poles 15, and three or more floats 16 having a through hole are attached thereto to stabilize the attitude of floating.

The floating means may have a shape other than the one shown in FIG. 3 or may be comprised of other means such as a catamaran. The floating member may be comprised of a hollow member or a foamed material having independent bubbles.

Reference numeral 17 denotes a bearing bush at the lower end of the rotary shaft, and 18 denotes holding members of the vortex guide plate 1 and of the cylindrical cover 3.

The cylinders 14 are cylindrical actuators constituted by electromagnetic solenoids or pneumatic pressure or hydraulic pressure cylinders which are controlled being interlocked to the impeller drive unit 20. That is, the cylinders 14 operate simultaneously with the rotation of the impeller 2, whereby the slide bars 12 descend to submerge the cylinder 6 in the water. When the impeller discontinues to rotate, on the other hand, the cylinders are deenergized, and the slide bars recede permitting the cylinder to float. By submerging the cylinder 6 as described above, the flow path to the vortex guide plate 1 is "opened" and "shut off" to exhibit quite the same switching function as the one described with reference to FIG. 2.

In FIG. 3, the right half of the rotary shaft 5 shows the condition where the impeller is rotating, and the left half shows the condition where the impeller is at rest. In the case of the float type as in this embodiment, an anchoring rope is provided to prevent the rotation caused by the impeller.

According to the apparatus of the present invention as described above by way of various embodiments, the floating liquid such as an oil on the water or an organic solvent on the water is separated and recovered maintaining good efficiency even when the floating liquid has a high viscosity. Furthermore, the liquid that is once collected and stored is not permitted to scatter to the outside from the cylinder even when the impeller is stopped. Therefore, the apparatus of the invention can serve as effective means to cope with pollution and contamination in natural environment or in diversifying industrial fields which are the social problems at the present time, since it is capable of storing even a film-like floating liquid of very small amounts up to a predetermined amount that can be recovered by suction and it is also capable of intermittently operating being interlocked to the floating liquid detector.

What is claimed is:

1. An apparatus for separating and recovering from a body of liquid, the lighter of two liquids which are insoluble in each other comprising vortex guide plate adapted to be dispersed in the body of liquid, said guide plate having a submerged portion thereof adapted to extend below the surface of the body of liquid, collecting means disposed at the center of said vortex plate, said collecting means including a body having an upper end and a lower end, said upper end adapted to be disposed below the surface of the liquid body and said lower end extending below said submerged portion of said vortex guide plate, a rotary impeller disposed below said collecting means, said rotary impeller being concentrically disposed to said vortex plate, means for effecting rotation of said impeller towards the central axis, and a cylinder having a cover and cylindrical shell depending from said cover, said cover being disposed between said vortex guide plate and said impeller, and said cover having an opening therein, said opening having a diameter smaller than the diameter of said impeller, and said shell being open at its lower end.

2. An apparatus as defined in claim 1, wherein said body is separated from said vortex guide plate in a manner to move up and down relative thereto, but without rotation, actuators to drive said body up and down, an impeller drive unit, said actuators being driven by said impeller drive unit so that the upper end of the body submerges in the water when the impeller is rotated and the upper end of the body extends above the surface of the liquid body when the impeller is stopped.

3. The apparatus as defined in claim 2 and including means for withdrawing the lighter liquid from said collecting means.

4. An apparatus as defined in claim 2 wherein said impeller drive unit includes a rotary drive shaft comprising:

means for axially mounting said body of said collecting means on said shaft, and means for actuating said shaft for submerging the upper end of said collector means when said impeller is actuated and for raising said upper end of the collector above the surface of the body of liquid when the impeller is deactivated.

5. The apparatus as defined in claim 4 and including means for biasing said collecting means in the raised position thereof when said impeller is deactivated.

6. The apparatus as defined in claim 5 wherein said means for actuating said collecting means comprises a centrifugal governor means interposed between said collecting means and said impeller.

7. The apparatus as defined in claim 4 whereby said means for actuating said collecting means includes a piston and cylinder assembly actuated by said impeller drive means.

8. An apparatus for separating and recovering from a body of liquid the lighter of two liquids which are insoluble in each other comprising a vortex means adapted to be placed in a body of liquid to be separated, an impeller means disposed below said vortex means, a cylindrical means, said cylindrical means including a cover having an opening therein disposed between said vortex means and said impeller, and a cylindrical body portion depending from said cover, said body portion having a diameter which is greater than the diameter of said impeller, a collector means disposed at the center of said vortex means for collecting the lighter liquid separated from the body of liquid, said collector means mounted for relative axial movement with respect to said vortex means, means for actuating said collector means for said axial movement relative to said vortex means, drive means for actuating said impeller means, said means for actuating said collector means being responsive to said drive means.

* * * * *